(12) United States Patent
Orgill

(10) Patent No.: US 8,756,690 B2
(45) Date of Patent: Jun. 17, 2014

(54) EXTENSIBLE AUTHENTICATION PROTOCOL ATTACK DETECTION SYSTEMS AND METHODS

(75) Inventor: Jason Orgill, Boston, MA (US)

(73) Assignee: Symbol Technologies, Inc., Holtsville, NY (US)

( * ) Notice: Subject to any disclaimer, the term of this patent is extended or adjusted under 35 U.S.C. 154(b) by 918 days.

(21) Appl. No.: 12/570,671

(22) Filed: Sep. 30, 2009

(65) Prior Publication Data

US 2011/0078793 A1 Mar. 31, 2011

(51) Int. Cl.
*H04L 29/06* (2006.01)
(52) U.S. Cl.
USPC .............. 726/23; 726/24; 726/25; 726/26; 726/27; 726/28; 713/168; 713/169; 713/170; 713/174
(58) Field of Classification Search
USPC .......................................... 726/23
See application file for complete search history.

(56) References Cited

U.S. PATENT DOCUMENTS

| 2005/0010680 | A1* | 1/2005 | Zick et al. ............ | 709/237 |
| 2005/0097362 | A1* | 5/2005 | Winget et al. ......... | 713/201 |
| 2008/0043686 | A1 | 2/2008 | Sperti et al. | |
| 2008/0132206 | A1* | 6/2008 | Suzuki .................. | 455/411 |

OTHER PUBLICATIONS

International Search Report & Written Opinion mailed on Dec. 21, 2010 for International Application No. PCT/US2010/049977.

Tseng et al.: "USIM-based EAP-TLS Authentication Protocol for Wireless Local Area Networks", Computer Standards and Interfaces, Elsevier Sequoia. Lausanne, vol. 31, No. 1, Jan. 1, 2009, pp. 128-136.
Mohamad Badra et al.: "TLS Tandem", New Technologies, Mobility and Security, 2008, IEEE, Piscataway, NJ, USA, Nov. 5, 2008, pp. 1-5.
Weill Huang et al.: "WLAN Authentication System Based on the Improved EAP-TLS Protocol", Web Mining and Web-Based Application, 2009, Second Pacific-Asia Conference on, IEEE, Piscataway, NJ, USA, Jun. 6, 2009, pp. 112-115.
Badra M et al.: "Toward SSL Integration in SIM Smartcards", Wireless Communications and Networking Conference, 2004, IEEE Atlanta, GA, USA, Mar. 21-25, 2004, Piscataway, NJ, USA, IEEE, vol. 2, pp. 889-894.
International Preliminary Report on Patentability dated Apr. 12, 2012 in related case PCT/US2010/049977.
Simpson, W., "The Point-to-Point Protocol (PPP)," Network Working Group, RFC 1661, Jul. 1994, 54 pages.
Zorn, G., et al., "Microsoft PPP CHAP Extensions," Network Working Group, RFC 2433, Microsoft Corporation, Oct. 1998, 21 pages.
Zorn, G., "Microsoft PPP CHAP Extensions, Version 2," Network Working Group, RFC 2759, Microsoft Corporation, Jan. 2000, 21 pages.
Rigney, C., et al., "Remote Authentication Dial in User Service (RADIUS)," Network Working Group, RFC 2865, Jun. 2000, 77 pages.

(Continued)

*Primary Examiner* — Longbit Chai

(57) ABSTRACT

The present disclosure provides systems and methods for detecting attacks against authentication mechanisms that generate Transport Layer Security (TLS) tunnels using a server public key. Such attacks can include misconfigured wireless local area network (WLAN) clients that fail to authenticate the server public key prior to creating the TLS tunnels and exchanging credentials. In an exemplary embodiment, an intrusion detection system (IDS) or intrusion prevention system (IPS) is aware of the server public key and monitors for authentication handshakes to detect invalid keys.

16 Claims, 3 Drawing Sheets

(56) References Cited

OTHER PUBLICATIONS

Aboba, B., et al., "Extensible Authentication Protocol (EAP)," Network Working Group, RFC 3748, Jun. 2004, 68 pages.
Aboba, B., et al., "Extensible Authentication Protocol (EAP) Key Management Framework," Network Working Group, RFC 5247, Aug. 2008, 80 pages.
Stanley, D., et al., "Extensible Authentication Protocol (EAP) Method Requirements for Wireless LANs," Network Working Group, RFC 4017, Mar. 2005, 12 pages.
"University research aims at more secure Wi-Fi," EE Times, Sep. 1, 2006, 2 pages.
"How to configure PEAPvO to reduce potential risks against man-in-the-middle attacks and against password-based attacks when you use authentication servers in Windows Vista or in Windows Server 2008," Article ID: 941123, Revision—2.4, Nov. 25, 2007, 4 pages.
Wright, J., et al., "PEAP: Pwned Extensible Authentication Protocol," ShmooCon 2008, 42 pages.

* cited by examiner

EXTENSIBLE AUTHENTICATION PROTOCOL ATTACK DETECTION SYSTEMS AND METHODS

FIELD OF THE INVENTION

The present invention relates generally to network security. More particularly, the present invention relates to systems and methods for detecting attacks against authentication mechanisms that generate Transport Layer Security (TLS) tunnels using a server public key.

BACKGROUND OF THE INVENTION

Conventionally, WLAN attack tools exist (such as "free-radius-wpe") that enable an attacker to spoof a network authentication server or network access server (both used herein interchangeably as NAS) and capture a client network password or password hash for an offline dictionary attack. For example, FreeRADIUS Wireless Pwnage Edition is a tool that enables an attacker to establish a Transport Layer Security (TLS) tunnel with a client that does not validate server certificates, and captures the credentials exchanged within the tunnel. This attack targeting Extensible Authentication Protocol-Tunneled Transport Layer Security (EAP-TTLS) and Protected EAP (EAP-PEAPv0) authenticated wireless clients is unanswered in the wireless intrusion detection industry. Furthermore, if traditional wireless intrusion detection methodology were to be applied to detect these attacks, the signature would be complex and the alarm would be prone to false negatives and false positives. Many enterprise WLANs employ PEAPv0 as an authentication mechanism for their wireless infrastructure. In many deployments, the credentials captured in the attack are identical to a user's domain credentials, for convenience. An attacker can use these credentials to access the wireless network as an authorized user and potentially other corporate resources as well. Disadvantageously, conventional wireless intrusion detection systems (WIDS) and wireless intrusion prevention systems (WIPS) do not detect this attack.

BRIEF SUMMARY OF THE INVENTION

In an exemplary embodiment of the present invention, a detection system includes a monitoring device configured to monitor frames on a network; a data store loaded with a server public key; and a detection module configured to detect authentication based on the frames and to determine whether a public key associated with the authentication is valid based on the server public key. The detection module is further configured to provide one of an alarm and an alert responsive to detecting an invalid authentication thereby allowing one of a password reset, active termination, and reconfiguring of a misconfigured device. The monitoring device is configured to monitor the frames between a client device and an access device, and wherein the access device is configured to create a Transport Layer Security (TLS) tunnel with the client through the exchange of the public key associated with the authentication. The detection module is configured to detect an attack whereby the access device includes a spoofed access device of a legitimate access device. The client is not configured to authenticate the public key prior to creating the TLS tunnel and exchanging credentials with the access device, thereby leaving the client susceptible to an attack. The credentials can be exchanged based upon one of Password Authentication Protocol (PAP), Challenge Handshake Authentication Protocol (CHAP), Microsoft Challenge Handshake Authentication Protocol version 1 (MS-CHAPv1), and Microsoft Challenge Handshake Authentication Protocol version 2 (MS-CHAPv2). The authentication can be based on Extensible Authentication Protocol (EAP). The detection module is configured to detect the attack based on monitoring a single frame of the frames, and wherein the single frame comprises a Server Hello message with the public key. The network can include a wireless network utilizing IEEE 802.11 protocols, the client can include a wireless device, the access device can include a wireless access point with a Remote Authentication Dial In User Service (RADIUS) server, and the authentication is complaint to IEEE 802.1X. The authentication can be compliant to any of Extensible Authentication Protocol—Transport Layer Security (EAP-TLS), Extensible Authentication Protocol—Tunneled Transport Layer Security (EAP-TTLS), Extensible Authentication Protocol—Protected Extensible Authentication Protocol (PEAP), and Lightweight Extensible Authentication Protocol (LEAP). The server public key is one of preloaded and learned.

In another exemplary embodiment of the present invention, a method for detecting extensible authentication protocol attacks includes, at a detection system, getting an authentication server public key; monitoring frames transmitted on a network; detecting an EAP authentication in one of the frames; and determining if the EAP authentication is valid. The method further includes checking a public key in the EAP authentication in responsive to the authentication server public key, wherein the determining step determines whether the EAP authentication is valid based upon checking the public key. The method further includes providing an alert responsive to an invalid EAP authentication; and performing one of a password reset, active termination, and reconfiguring of a misconfigured device responsive to the alert. The frames are transmitted between a client device and an access device, and wherein the access device is configured to create a Transport Layer Security (TLS) tunnel with the client through the exchange of the public key associated with the authentication. The client is not configured to authenticate the public key prior to creating the TLS tunnel and exchanging credentials with the access device. The determining step is configured to detect validity of the EAP authentication based on monitoring a single frame of the frames, and wherein the single frame comprises a Server Hello message with the public key. The network can include a wireless network utilizing IEEE 802.11 protocols, the client can include a wireless device, the access device can include a wireless access point with a RADIUS server, the authentication is complaint to IEEE 802.1X, and the EAP authentication is compliant to any of EAP-TLS, EAP-TTLS, PEAP, and LEAP.

In yet another exemplary embodiment of the present invention, a wireless intrusion detection system includes a wireless monitoring device configured to monitor data transmitted on a wireless network; and a detection module configured to detect valid and invalid extensible authentication protocol requests between a client and an access point responsive to monitored data on the network, wherein the detection module is further configured to provide one of an alarm and an alert responsive to detecting an invalid request thereby allowing one of a password reset, active termination, and reconfiguring of the client. The detection module is configured to detect spoofed access points whereby the access point utilizes an extended service set identifier of a legitimate access point to exchange credentials with the client, and wherein the client is misconfigured as to not authenticate a public key of the access point thereby creating a Transport Layer Security (TLS) with the access point and exchanging the credentials.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to systems and methods for detecting attacks against authentication mechanisms that generate Transport Layer Security (TLS) tunnels using a server public key. Such attacks can include misconfigured wireless local area network (WLAN) clients that fail to authenticate the server public key prior to creating the TLS tunnels and exchanging credentials. In an exemplary embodiment, an attack detection system includes a monitoring device configured to monitor frames on a network; a data store loaded with a server public key; and an algorithm configured to detect authentication based on the frames and to determine whether a public key associated with the authentication is valid based on the server public key. The systems and methods of the present invention can apply to a wireless network compliant to IEEE 802.11 utilizing IEEE 802.1X authentication as well as any other network type utilizing EAP.

Figure 1:
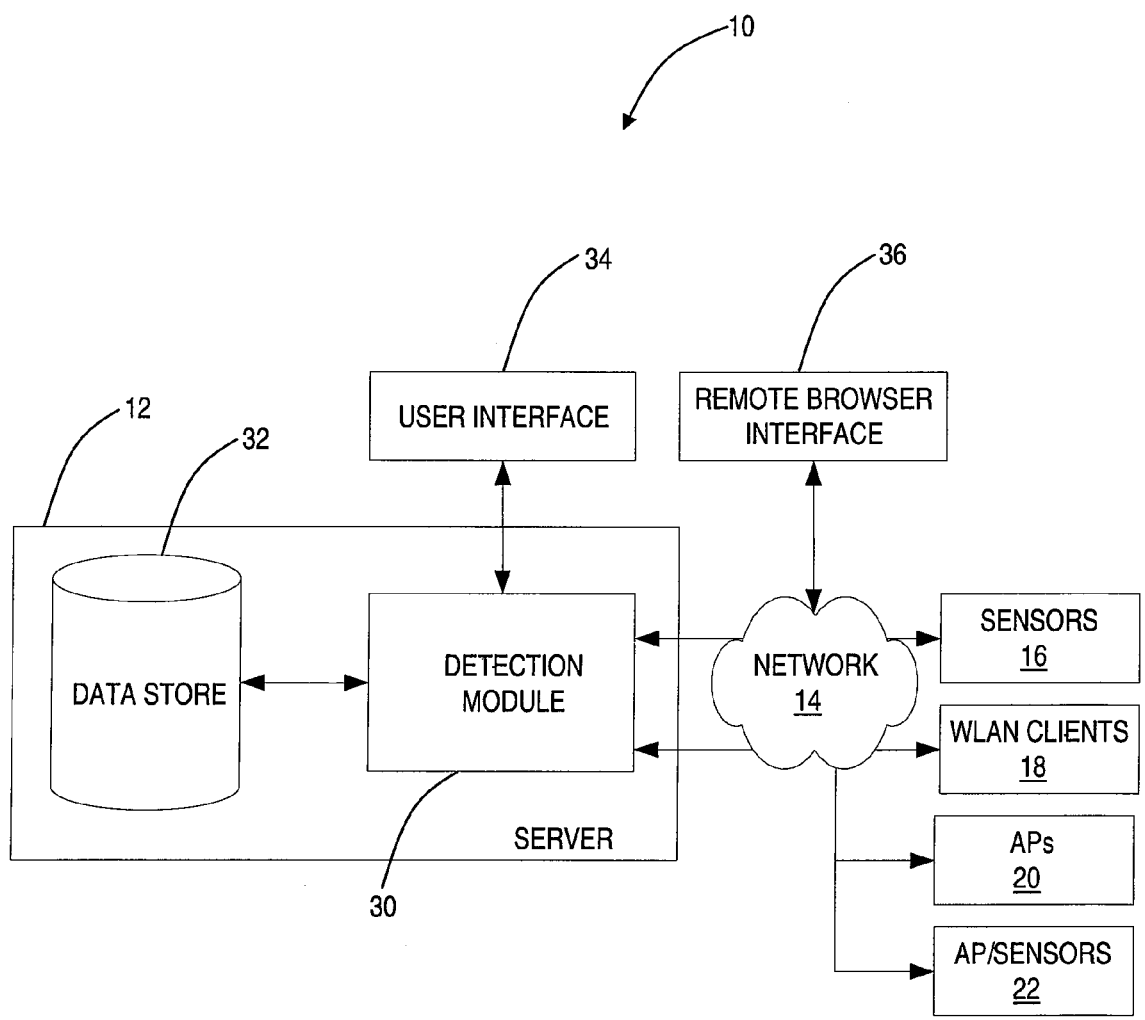
FIG. 1 is a functional block diagram of a wireless intrusion detection system (WIDS) and wireless intrusion prevention systems (WIPS) according to an exemplary embodiment of the present invention.

Referring to FIG. 1, a functional block diagram of a WIDS/WIPS 10 is illustrated according to an exemplary embodiment of the present invention. The WIDS/WIPS 10 includes a server 12 connected through a network 14 to a plurality of distributed sensing/access devices including wireless sensors 16, WLAN clients 18, APs 20, and combined APs/sensors 22. It should be appreciated that FIG. 1 depicts the WIDS/WIPS 10 in an oversimplified manner and a practical embodiment can include additional components and suitably configured processing logic to support known or conventional operating features that are not described in detail herein. The network 14 can include wired and wireless components and can be geographically diverse with the plurality of distributed sensing/access devices distributed throughout the diverse geography. Each of the wireless sensors 16, WLAN clients 18, APs 20, and combined APs/sensors 22 is configured to monitor wireless traffic transmitted on the wireless network and to provide the monitored data, statistics, events, etc. to the server 12. For example, this monitoring can include stripping overhead data, analyzing the data, and providing the analyzed data to the server 12. The sensors 16 are positioned at various locations to monitor wireless traffic over the network 204. The sensors 206 are overlaid or standalone devices configured to passively monitor wireless activity, analyze the activity, and to relay the results to the server 12. Additionally, the sensors 16 can be configured to terminate wireless devices and the like. The sensors 16 are accordingly proximate to multiple APs, wireless clients, and the like.

The WIDS/WIPS 10 can include WLAN clients 18 that are generally wireless devices configured with a software agent that enables the wireless device to passively monitor the wireless network periodically, such as when the wireless device is idle. For example, the WLAN clients 18 can include computers with WLAN cards or the like. Here, the computer can provide monitoring while idle and forward the analyzed data to the server 12. Typically, wireless devices significantly outnumber the quantity of sensors 16 and APs 20 by several orders of magnitude. Advantageously, the sheer quantity of the WLAN clients 18 can provide significant monitoring coverage of the wireless network without requiring additional hardware since the WLAN client 18 is a software agent that can be installed on an enterprise's computers. Note, in addition to acting as monitoring devices, the WLAN clients 18 also can communicate on the wireless network through the APs 20, 22. For example, the APs 20, 22 can use IEEE 802.11i which implements IEEE 802.1X for network access control of the WLAN clients 18. IEEE 802.1X is based on EAP and provides port-based authentication. Here, the APs 20, 22 operate as a Remote Authentication Dial In User Service (RADIUS) server compliant to RFC2865.

Extensible Authentication Protocol (EAP) is a universal authentication framework frequently used in wireless networks and Point-to-Point connections (defined in RFC 3748 and updated by RFC 5247). Although the EAP protocol is not limited to WLANs and can be used for wired LAN authentication, it is most often used in wireless LANs. The Wi-Fi Protected Access (WPA and WPA2) standard has officially adopted five EAP types as its official authentication mechanisms. The EAP provides some common functions and a negotiation of the desired authentication mechanism. Such mechanisms are called EAP methods and there are currently about 40 different methods. Methods defined in IETF RFCs include EAP-MDS, EAP-OTP, EAP-GTC, EAP-TLS, EAP-IKEv2, EAP-SIM, and EAP-AKA, and in addition a number of vendor specific methods and new proposals exist. Commonly used modern methods capable of operating in wireless networks include EAP-TLS, EAP-SIM, EAP-AKA, PEAP, LEAP and EAP-TTLS. Requirements for EAP methods used in WLAN authentication are described in RFC 4017. When EAP is invoked by an 802.1X enabled NAS (Network Access Server) device such as an 802.11 a/b/g/n Wireless Access Point, modern EAP methods can provide a secure authentication mechanism and negotiate a secure PMK (Pair-wise Master Key) between the client and NAS. The PMK can then be used for the wireless encryption session which uses TKIP or CCMP (based on AES) encryption.

The wireless network includes the APs 20 to allow wireless communication devices to connect to a wireless network using Wi-Fi (IEEE 802.11), Bluetooth or related standards. As described herein, the APs 20 can include APs with one or more radios, thin APs, wireless switches, wireless controllers, and the like. The APs 20 can connect to the network 14 through a wired or a wireless connection. Typically, the APs 208 include one or more radios operating on one or more wireless channels to provide wireless access. Existing APs 20 can provide dual access and sensing functionality on a periodic basis, such as monitoring off channels with an extra radio or monitoring while not providing access to the wireless network. However, the sensing functionality of the APs 20 is not 24×7 and also suffers desensitization from the access radio. In addition to the sensors 16, the WLAN clients 18, and the APs 20, the combined AP/sensor 22 device can provide both access and monitoring of the wireless network. This AP/sensor 22 includes multiple radios configured to provide both access and sensing functionality with corresponding connections to the server 12 and to the network 14. The AP/sensor 22 provides all the benefits of WLAN infrastructure, without sacrificing the 24×7 dedicated security monitoring and performance troubleshooting available from an overlaid security system, while reducing the deployment cost and management complexity, by sharing a common hardware platform for the WLAN Access Point (AP) and sensor and leveraging an integrated management system.

The server 12 includes a detection module 30 and a data store 32. The detection module 30 generally includes a processing element and interfaces to the network 14. The detection module 30 is configured to receive data, statistics, events, etc. from the sensors 16, the WLAN clients 18, the APs 20, and the AP/Sensors 22, to analyze and correlate the data, and to store the data in the data store 32. In an exemplary embodiment, the detection module 30 can apply multiple intrusion detection tests to received data to detect possible intrusions or violations. These intrusion detection tests can relate to wireless policy deviations, statistical anomalies, signature-based attacks, wireless protocol usage, and the like. The server 12 can be accessed through a user interface 34 locally or remotely through a remote browser interface 36. Specifically, the server 12 can include a Graphical User Interface (GUI) to display network topology, alarms and warnings, network performance, vulnerabilities and the like. The GUI can also be utilized to configure the server 12 and the sensors 16, the WLAN clients 18, the APs 20, and the AP/Sensors 22. The UI 34 and interface 36 can provide a single point of control for both WLAN infrastructure management and wireless security management. In another exemplary embodiment, the WIDS/WIPS 10 can include the functionality with the server 12 integrated within any of the distributed sensing/access devices distributed throughout the diverse geography, i.e. the wireless sensors 16, WLAN clients 18, APs 20, and combined APs/sensors 22. In this embodiment, the WIDS/WIPS 10 can be referred to as a stand-alone system. Those of ordinary skill in the art will recognize the systems and methods described herein are contemplated for use with any WIDS/WIPS 10 regardless of configuration.

In the present invention, the WIDS/WIPS 10 is configured to provide efficient identification of attacks against EAP-based authenticated clients, such as through the detection module 30. To provide this identification, the WIDS/WIPS 10 is preloaded with public keys associated with the APs 20, 22. This detection mechanism does not utilize the traditional signature based schemes used by the WIDS/WIPS 10. Specifically, using a signature based detection scheme on traditional WIDS detection methodology, i.e., comparing what was monitored over the wireless medium with pre-defined signatures, the detection of this high-impact attack is cumbersome at best. Significant research has been done relating to the detection of spoofed APs using spoofed MAC addresses, which would be pre-requisite for detecting this attack using existing WIDS methodology. Some methods include AP fingerprinting and 802.11 sequence number analysis. Both utilize the same methodology for detection, which is the industry standard—relying exclusively on information gathered over the air to feed the detection algorithm. If any of these or other methods for detecting spoofed access points were reliable in identifying spoofed APs, then it would be trivial to extend the detection algorithm to include EAP traffic initiated to detect these specific attacks described in this disclosure. However, these methods are prone to false positives.

The present invention employs the validation of an AP/Authenticator public key by the WIDS/WIPS 10 against a pre-loaded server certificate, which contains the server public key, thereby producing a zero false positive rate and false negative rate only limited to the physical limits of the WIDS/WIPS 10 being in range and on the same channel as this singular outer tunnel handshake frame is sent. This method also has the benefit of only requiring the WIDS/WIPS 10 to sniff a single packet to make the detection. On the contrary, if behavioral methods are employed to track the various stages of the authentication, multiple frames need to be captured and analyzed. Since present-day WIDS/WIPS 10 channel-hop, it is more likely that the attack may be captured in its entirety using the disclosed method.

Figure 2:
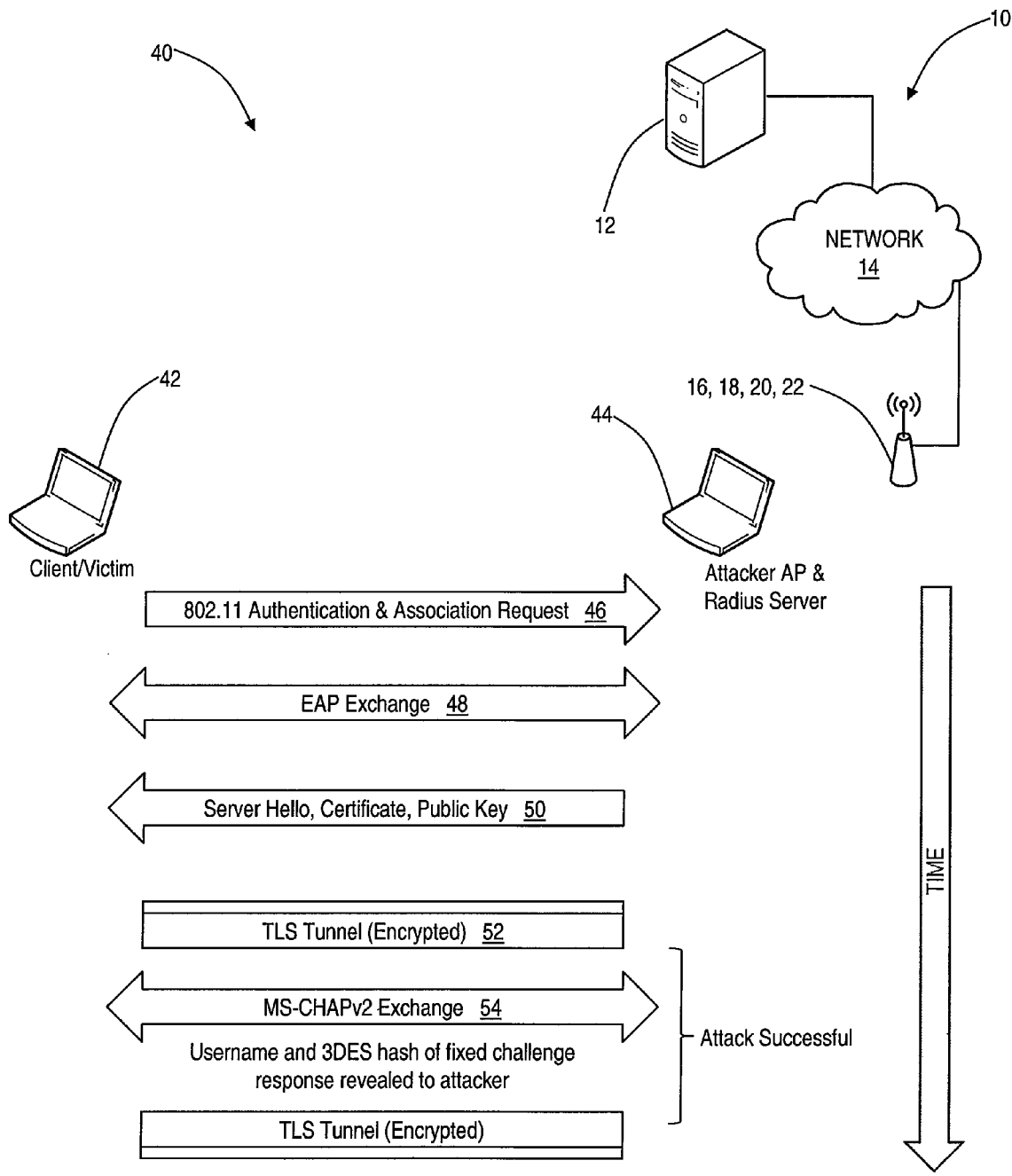
FIG. 2 is a diagram of an operation of an attack and detection according to an exemplary embodiment of the present invention.

Referring to FIG. 2, a diagram illustrates an operation 40 of an attack and detection according to an exemplary embodiment of the present invention. The operation 40 includes a client/victim 42 (hereinafter referred to as client 42) and an attacker AP and RADIUS server 44 (hereinafter referred to as AP 44). The client 42 is a wireless device, such as a computer with a WLAN interface, a smart-phone, a personal digital assistant (PDA), a music player (e.g., mp3), a video gaming console, a portable video game device, a printer, a mobile unit with a wireless interface, or any other device configured with a wireless networking interface. The AP 44 is an attacker who is spoofing the Service set identifier (SSID) of a legitimate AP for purposes of stealing passwords of the client 42. The client 42 and the AP 44 are communicating according to IEEE 802.11 protocols and variations thereof. The client 42 is misconfigured in that the client is not configured to validate the server certificate of the AP 44. In brief, the attack is executed as the AP 44 assumes the identity of a trusted access point and radius server. The client 42 that is misconfigured to not validate the identity of the radius server using certificates and will connect to the attacker radius server via the attacker AP 44 and continue its authentication to the EAP-PEAP or EAP-TTLS authenticated attacker network. Further, because IEEE 802.11 management frames can be spoofed, the AP 44 is masquerading as the trusted access point and radius server. Additionally, the WIDS/WIPS 10 is included in the operation 40 monitoring the wireless transmissions between the client 42 and the AP 44 with one of the distributed monitoring devices 16, 18, 20, 22.

The operation 40 begins with the client 42 sending an IEEE 802.11 authentication and association request to the AP 44 (step 46). Specifically, the client 42 is requesting association with an SSID that it believes is real, but is being spoofed by the AP 44. Next, there is an EAP exchange (step 48) followed by a server HELLO, certificate exchange, and public key (step 50). In the authentication process, before user credentials are exchanged with the legitimate or spoofed authentication server (e.g., AP 44 in FIG. 2), an outer TLS tunnel is established to prevent the credentials from being exchanged in the clear (step 52). In order for this TLS tunnel to be established, the authenticator must provide the client with its public key as shown in step 50. Even when clients are misconfigured to not check the validity of the server certificate, as is the case with clients vulnerable to the attack such as the client 42, the client must use the public key advertised to encrypt the pre-master secret and send it to the authenticator. The authenticator then uses its corresponding private key to decrypt the pre-master secret. Following several other key derivations by both the client and server based on this secret, a TLS tunnel is established. Consequently, the only frame of interest that must be analyzed by the WIDS/WIPS 10 system is the "Server Hello" message TLSv1 handshake frame sent from the authentication server to the client supplicant prior to establishing the encrypted TLS tunnel. This frame includes the server certificate and consequently the public key. Once the TLS tunnel is established, the AP 44 and the client 42 provide an exchange (step 54), such as a Microsoft CHAP version 2 (MS-CHAPv2 defined in RFC2759) exchange. Here, the username and 3DES hash of the fixed challenge response for the client 42 is revealed to the AP 44 thereby completing a successful attack.

During this exchange with the attacker AP 44, the client 42 authentication credentials are revealed clearly or in hashed form, enabling the offline dictionary attacks that plagued LEAP authenticated wireless networks in the past. One problem is that existing wireless intrusion detection systems would have difficulty determining if this was a valid authentication event, since they rely upon the authenticity of WLAN transmissions for deriving security events, and wireless MAC addresses and frame sequence numbers can be spoofed by the attacker AP 44. This would lead to false negatives. False positives would result depending upon how similar legitimate infrastructure access points behave in comparison to the predefined wireless intrusion detection signature. The impact of this attack is potentially very high.

In the present invention, efficient identification of attacks against EAP-based authenticated clients (such as those using EAP-TLS, EAP-TTLS, EAP-PEAPv0, LEAP, etc.) can be detected by utilizing one other piece of network-specific information that has yet to be used in conjunction with the WIDS/WIPS 10: the authentication server public key. EAP-TLS is EAP-Transport Layer Security and is one of the most secure and most difficult to deploy wireless authentication schemes. EAP-TTLS is EAP-Tunneled Transport Layer Security developed by Funk Software and Certicom, and it is similar to PEAPv0, with the exception that the credential exchange mechanism within the TLS tunnel is not limited to MSCHAPv2, but also supports Challenge Handshake Authentication Protocol (CHAP, defined in RFC1661), Microsoft CHAP (MS-CHAP defined in RFC2433), and Password Authentication Protocol (PAP). PEAPv0 is Protected EAP developed by Microsoft and installed by default on Windows operating system based devices, thus it is a popular authentication protocol due to its adoption by Windows and deployment ease. LEAP is Lightweight EAP developed by Cisco as an easy-to-deploy wireless authentication scheme. However, its use of MS-CHAPv2 over the clear exposes networks to the risk of offline dictionary attacks against passwords.

In the present invention, the WIDS/WIPS 10 includes the authentication server public key, i.e. the public key of the real AP 44 as well as the public keys of any other authentication servers (APs and the like), stored in the data store 32 or equivalent. Specifically, the distributed monitoring devices 16, 18, 20, 22 are configured to monitor in conjunction with the server 12 for handshake frames (i.e., Server Hello, certificate, and public key in step 50) from the AP 44 or other authentication device with the same Extended SSID (ESSID) as a legitimate network device (or other similar criteria). The WIDS/WIPS 10 is configured to check the public key transmitted in the Server Hello packet with its stored authentication server public key. If these do not match, the WIDS/WIPS 10 can be certain that an authentication session with an attacker authentication server is occurring. Essentially, the burden of validating the identity of an authentication server can be shared by the WIDS/WIPS 10, providing value in cases where clients have been misconfigured to not validate the server identity.

Conventional WIDS/WIPS have not utilized a network's public key infrastructure (PKI) at all, let alone in this way. In order for detection to occur, the server public key is preloaded onto or learned by the WIDS/WIPS 10 system. Additionally, this mechanism cannot be circumvented by the attacker; it would be futile for the attacker to spoof the public key of the server, since the client uses the server public key to encrypt a pre-master secret which is sent to the server in the TLS tunnel establishment. If the attacker were to spoof the public key of the server, the attacker would not be able to decrypt the pre-master secret, since the attacker did not possess the server's private key. Consequently, no master secret is derived, and no symmetric session keys are derived to establish and encrypt the TLS tunnel. Without the TLS tunnel established, the client will not exchange its authorization credentials using the PAP, MS-CHAPv1, MS-CHAPv2 exchange mechanisms, which is the goal of the attack.

Figure 3:
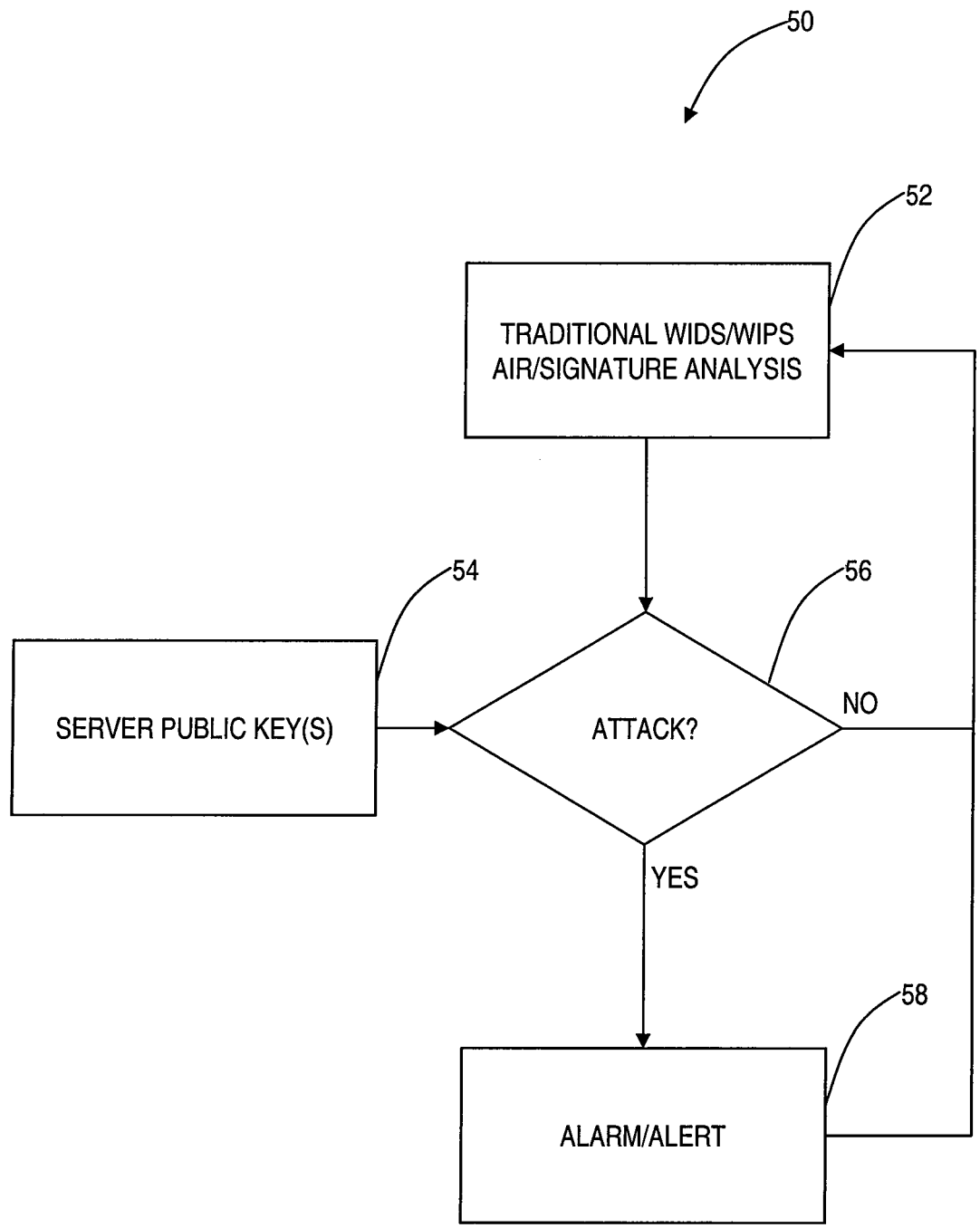
FIG. 3 is a flowchart of an attack detection process according to an exemplary embodiment of the present invention.

Referring to FIG. 3, a flowchart illustrates an attack detection process 50 according to an exemplary embodiment of the present invention. As described herein, the present invention contemplates integration and use with any existing wireless monitoring system, such as a WIDS or WIPS. In an exemplary embodiment, the attack detection process 50 can be implemented through the WIDS/WIPS 10 through the detection module 30. The wireless monitoring system is configured to provide traditional air/signature analysis (step 52). Specifically, the wireless monitoring system is configured to monitor the wireless network performing analysis of the transmitted data to detect intrusions and violations. In addition to this traditional monitoring, the wireless monitoring system is configured to detect authentication handshakes between AP/Authenticator pair. Specifically, the wireless monitoring system includes authentication server public key of the AP as well as other authentication devices in the network (step 54). To detect an attack, the wireless monitoring system can check a transmitted public key (based on the ESSID associated with the device transmitting the public key) versus the authentication server public key stored in step 54. If there is no mismatch, then the wireless monitoring system can continue monitoring (step 52). A mismatch between these keys indicates detection of an attack, and the wireless monitoring system can respond by generating an alarm or alert to any of the client under attack, a network operator, or the like (step 58). Having the ability to accurately detect this type of attack would enable enterprise information technology administrators to immediately act to prevent an intruder from using stolen login credentials to access the network, since the alarm could report what client was a victim of an attack. Remedies could include a password reset, active termination by the wireless intrusion protection system against the offending access point and associated clients, or preventative action by correctly configuring the identified victim client to validate server certificates.

The present invention has been described herein with reference to a wireless network and the WIDS/WIPS 10. Those of ordinary skill in the art will recognize the present invention also contemplates use in other network types with their associated intrusion detection systems. For example, the present invention could be utilized in a wired network third-party validation of the server public key in TLS tunnel establishment. Additionally, the present invention has been described herein with reference to a misconfigured client that fails to authenticate the server key prior to establishing a tunnel. Those of ordinary skill in the art will also recognize the present invention contemplates use against any general attack against authentication mechanisms that generate TLS tunnels using the server public key.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A protocol attack detection system, comprising:
a monitoring device configured to monitor frames transmitted on a network between a client device and an access device;
a data store loaded with a server public key;
wherein the access device is configured to create a Transport Layer Security (TLS) tunnel with the client device through the exchange of a public key associated with the authentication, and
wherein the client cannot authenticate the public key prior to the creation of the TLS tunnel and exchanging credentials with the access device; and
a detection module, at a server, configured to receive said monitored frames from the monitoring device and to detect authentication based on the monitored frames and to determine whether a public key associated with the authentication is valid by checking the public key associated with the authentication against the server public key.

2. The detection system of claim 1, wherein the detection module is further configured to provide one of an alarm and an alert responsive to detecting an invalid authentication thereby allowing reconfiguring of the client device such that the client device can perform authentication.

3. The detection system of claim 1, wherein the detection module is configured to detect an attack whereby the access device comprises a spoofed access device of a legitimate access device.

4. The detection system of claim 1, wherein the credentials are exchanged based upon one of Password Authentication Protocol, Challenge Handshake Authentication Protocol, Microsoft Challenge Handshake Authentication Protocol version 1, and Microsoft Challenge Handshake Authentication Protocol version 2.

5. The detection system of claim 1, wherein the authentication is based on Extensible Authentication Protocol, and wherein the public key comprises an Access Point/Authenticator public key.

6. The detection system of claim 1, wherein the detection module is configured to detect the attack based on monitoring a single frame of the frames; and
wherein the single frame comprises a Server Hello message with the public key.

7. The detection system of claim 1, wherein the network comprises a wireless network utilizing IEEE 802.11 protocols;
wherein the client comprises a wireless device;
wherein the access device comprises a wireless access point with a Remote Authentication Dial In User Service server; and
wherein the authentication is complaint to IEEE 802.1X.

8. The detection system of claim 7, wherein the authentication is compliant to any of Extensible Authentication Protocol—Transport Layer Security, Extensible Authentication Protocol—Tunneled Transport Layer Security, Extensible Authentication Protocol—Protected Extensible Authentication Protocol, and Lightweight Extensible Authentication Protocol.

9. The detection system of claim 1, wherein the server public key is one of preloaded and learned.

10. A method for detecting extensible authentication protocol attacks, comprising:
at a detection system, accessing an authentication server public key, wherein the detection system is configured to receive monitored frames from a monitoring device;
monitoring frames, by the monitored device, transmitted on a network between a client device and an access device;
detecting an extensible authentication protocol authentication in the frames;
creating a Transport layer Security (TLS) tunnel by the access device with the client device through the exchange of the public key in the extensible authentication protocol authentication, wherein the client cannot authenticate the public key prior to creating the TLS tunnel and exchanging credentials with the access device; and
determining, by the detection system, if the extensible authentication protocol authentication is valid by checking the public key associated with the extensible authentication protocol authentication against the authentication server public key.

11. The method of claim 10, further comprising:
validating a public key in the extensible authentication protocol authentication in response to the authentication server public key.

12. The method of claim 10, further comprising:
providing an alert responsive to an invalid extensible authentication protocol authentication; and
performing reconfiguring of the client device responsive to the alert such that the client device can perform authentication.

13. The method of claim 10, wherein the determining step is configured to detect validity of the extensible authentication protocol authentication based on monitoring a single frame of the frames; and
wherein the single frame comprises a Server Hello message with the public key.

14. The method of claim 10, wherein the network comprises a wireless network utilizing IEEE 802.11 protocols;
wherein the client device comprises a wireless device;
wherein the access device comprises a wireless access point with a Remote Authentication Dial In User Service server;
wherein the authentication is complaint to IEEE 802.1X; and
wherein the extensible authentication protocol authentication is compliant to any of Extensible Authentication Protocol—Transport Layer Security, Extensible Authentication Protocol—Tunneled Transport Layer Security, Extensible Authentication Protocol—Protected Extensible Authentication Protocol, and Lightweight Extensible Authentication Protocol.

15. A wireless intrusion detection system, comprising:
a wireless monitoring device configured to monitor data transmitted on a wireless network between a client device and an access device;
wherein the access device is configured to create a Transport layer Security (TLS) tunnel with the client device through the exchange of a public key associated with the authentication, and
wherein the client cannot authenticate the public key prior to the creation of the TLS tunnel and exchanging credentials with the access device; and
a detection module, at a server, configured to receive the monitored data from the monitoring device and to detect valid and invalid extensible authentication protocol requests between a client and an access point responsive to monitored data on the network, wherein the detection module is able to detect valid and invalid extensible authentication protocol requests by checking the public key associated with the extensible authentication protocol authentication against an authentication server public key;

wherein the detection module is further configured to provide one of an alarm and an alert responsive to detecting an invalid request thereby allowing one of a password reset, active termination, and reconfiguring of the client.

16. The wireless intrusion detection system of claim 15, wherein the detection module is configured to detect spoofed access points whereby the access point utilizes an extended service set identifier of a legitimate access point to exchange credentials with the client device;

wherein the public key comprises an Access Point/Authenticator public key.

* * * * *